United States Patent [19]
Fedorko et al.

[11] Patent Number: 5,458,356
[45] Date of Patent: Oct. 17, 1995

[54] GARDEN CART HITCH

[76] Inventors: Eric J. Fedorko, 5; Edward A. Fedorko, both of P.O. Box 85, Portage, Pa. 15946

[21] Appl. No.: 277,478

[22] Filed: Jul. 19, 1994

[51] Int. Cl.⁶ .................................................. B60R 19/24
[52] U.S. Cl. ............................ 280/418.1; 280/47.18; 280/204
[58] Field of Search ................ 280/418.1, 47.2, 280/47.31, 491.1, 656, 415.1, 47.18, 204

[56] References Cited

U.S. PATENT DOCUMENTS

| | | | |
|---|---|---|---|
| 1,216,195 | 2/1917 | Williamson | 280/47.2 |
| 2,174,468 | 9/1939 | Kratfel | 280/491.1 |
| 3,837,677 | 9/1974 | Haskins | 280/476.1 |
| 4,052,079 | 10/1977 | Lehman | 280/47.2 |
| 4,281,950 | 8/1981 | Lehman et al. | 280/47.31 |
| 4,351,541 | 9/1982 | Propst et al. | 280/408 |
| 4,740,008 | 4/1988 | Johnson | 280/47.18 |
| 5,031,926 | 7/1991 | Wannamaker | 280/47.2 |
| 5,087,061 | 2/1992 | Wallace | 280/656 |

FOREIGN PATENT DOCUMENTS 749393  5/1933  France ................. 280/47.31

*Primary Examiner*—Kenneth R. Rice
*Attorney, Agent, or Firm*—Joseph H. McGlynn

[57] ABSTRACT

A hitch for a garden cart that has wheels and support legs. The hitch is positioned at an angle so when the hitch is attached to a vehicle, the support legs will be raised off the ground and the wheels of the garden cart will be used to support the load in the cart.

4 Claims, 1 Drawing Sheet

GARDEN CART HITCH

BACKGROUND OF THE INVENTION

1. Field of the Invention

There is a need for a cart that can be attached to a vehicle. In the past heavy loads were moved using many trips with a wheelbarrow. However, wheelbarrows could transport only light loads and were not stable. The new garden carts could handle larger loads and were more stable since they used two or more wheels. However, the larger loads were sometimes more than a single person could handle. This invention relates to a hitch or tow bar that can be attached to a garden cart to allow the cart to be hitched to a lawn tractor or similar vehicle. This will allow the user to move heavier loads than would be possible by hand or by a wheelbarrow.

2. Description of the Prior Art

Prior art devices are known which enable a person to hitch a device such as a wheelbarrow to a lawn tractor or similar vehicle. However, the prior art devices are all complicated and must use their own set of wheels. This makes these prior art hitches or tow bars cumbersome and expensive. Also, they are designed to be used with wheelbarrows which are unstable and are limited in the amount of load they can carry.

SUMMARY OF THE INVENTION

The present invention is designed to be used with garden carts which will carry a heavier load than a wheelbarrow. It utilizes a simple and inexpensive hitch or tow bar that is easy to attach to a vehicle and is less costly than prior art devices, since it utilizes the wheels on the garden cart and additional, costly wheels are unnecessary.

These and other objects and advantages of the present invention will be fully apparent from the following description, when taken in connection with the annexed drawings.

DESCRIPTION OF THE PREFERRED EMBODIMENT

Figure 1:
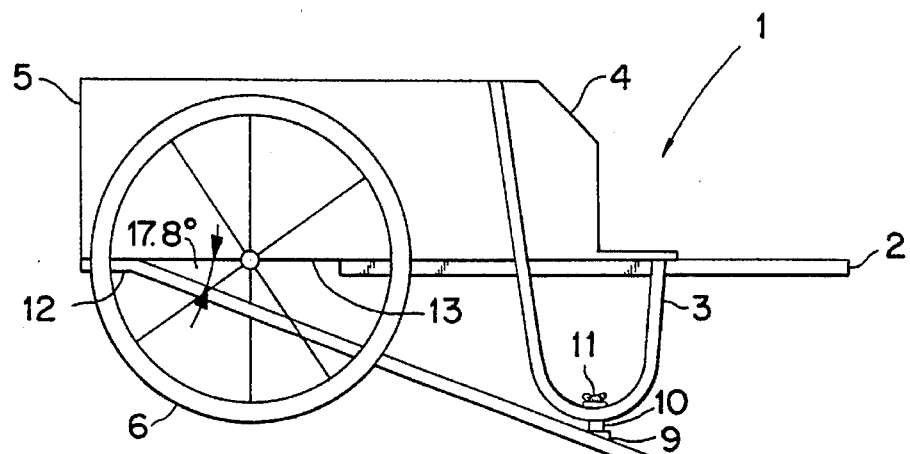
FIG. 1 is a side view of the hitch or tow bar attached to a garden cart.
Figure 2:
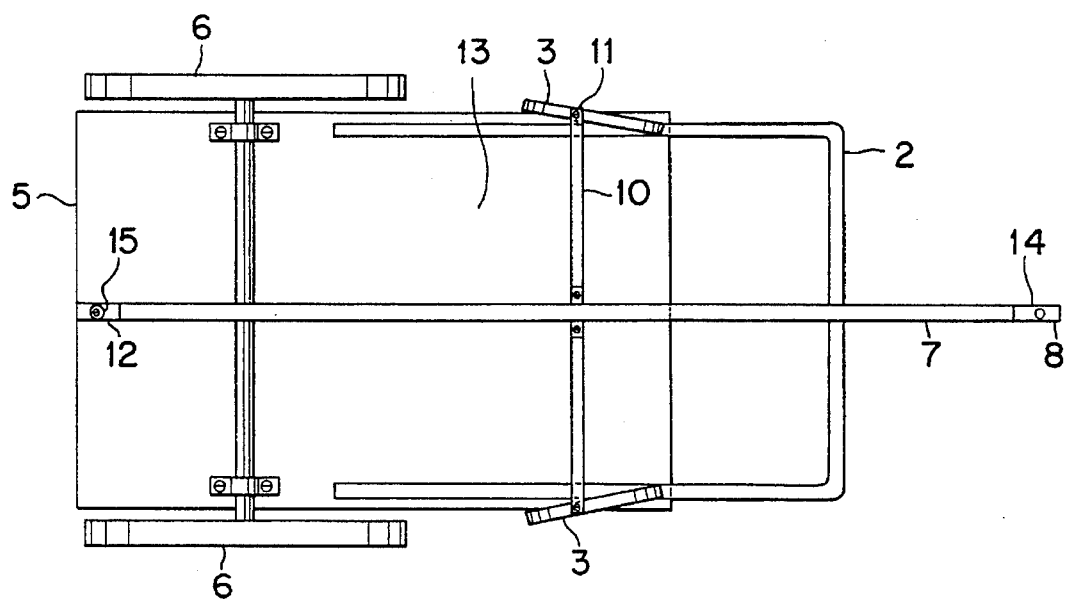
FIG. 2 is a view showing the underside of the garden cart with the hitch or tow bar attached.

A garden cart 1 utilizing the present invention is illustrated in FIG. 1. The garden cart 1 has sides 4, a bottom 13, a front 5, a handle 2, legs 3, and wheels 6. While the cart illustrated has only two wheels, the invention is not restricted to only carts with two wheels. Any cart, no matter how many wheels can be used with the hitch or tow bar of the present invention.

A tongue 7, made from channel shaped metal such as steel or aluminum is attached to the bottom of the cart 1. The tongue 7 has a straight portion 12 at one end and a pair of spaced metal pieces 8 at the opposite end. The pieces 8 have a hole 14 through them which will accept a rod (not shown) that attaches the tongue to a lawn tractor or the like (also not shown). The tongue 7 forms an angle of approximately 17.8° to the horizontal, so when the tongue is moved to a horizontal position, the legs 3 will be off the ground. It should be noted, the angle is designed for the particular cart shown in the drawings and if a different cart is used the angle may change depending on the design of the cart.

Intermediate the ends of the tongue 7 is a cross piece 10 which is attached to the legs 3. A wedge 9 is welded to the tongue at the position the cross piece crosses over the tongue to accommodate the angle of the tongue. A screw with a wing nut 11 is used to secure the cross piece 10 to the legs 3. It should be noted that the screw and wing nut are used merely as an example of one type of fastener. Any type of fastener that will attach the cross piece and the legs may be used.

Figure 3:
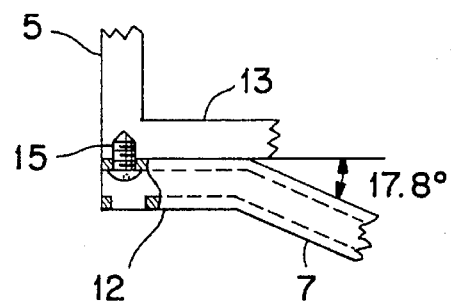
FIG. 3 is an enlarged partial view showing the attachment of the hitch or tow bar to the front of the cart.

At the end of the tongue that has portion 12, there is an over sized hole 12 that will allow a screw and a screw driver to pass through. Above the hole 12, as shown in FIG. 3, is a smaller hole that will accept a screw 15 to hold the end of the tongue to the underside 13 of the cart 1.

After the tongue 7 has been attached to the cart 1, the end of the tongue having the pieces 8 will be attached to a lawn tractor or similar vehicle. The tongue will be raised up which will lift the legs 3 off the ground. The cart can then be towed by the tractor and, of course a heavier load can be pulled by the tractor than can be pulled by hand.

Although the garden cart hitch or tow bar and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tow bar for a garden cart having sides, a bottom, a front, a back, at least two wheels mounted by means of an axle adjacent said front of said garden cart, and at least a pair of legs mounted adjacent said back, said tow bar comprising: a tongue portion consisting of a first portion and a second portion, said first portion extending in a plane parallel with said bottom of said garden cart when said tow bar is mounted on said garden cart, and said tongue having means for attaching said first portion to said bottom of said garden cart in front of said axle, said second portion of said tongue extending downward at an acute angle with respect to said plane of said first portion, means at the opposite end of said tongue from said first portion for attaching said tongue to a vehicle, a cross piece, having a first end and a second end, extending across said tongue with approximately one half of said cross piece extending on opposite sides of said tongue, said cross piece having means at said first end and said second end for attaching said cross piece to said legs of said garden cart when said tow bar is mounted on said garden cart.

2. The tow bar for a garden cart as claimed in claim 1, wherein said first portion of said tongue has an oversized hole that will allow a threaded fastener and a tool for said threaded fastener to pass through said over sized hole.

3. The tow bar for a garden cart as claimed in claim 1, wherein a wedge is attached to said tongue between said tongue and said cross piece.

4. The tow bar for a garden cart as claimed in claim 1, wherein said second portion of said tongue extends downward at an acute angle of approximately 17.8 degrees.

* * * * *